United States Patent [19]
Ichida

[11] Patent Number: 5,362,155
[45] Date of Patent: Nov. 8, 1994

[54] LINEAR MOTION ROLLING GUIDE UNIT

[75] Inventor: Tomohiro Ichida, Gifu, Japan

[73] Assignee: Nippon Thompson Co., Ltd., Tokyo, Japan

[21] Appl. No.: 134,843

[22] Filed: Oct. 12, 1993

[30] Foreign Application Priority Data

Oct. 13, 1992 [JP] Japan .............................. 4-077177[U]

[51] Int. Cl.5 ........................ F16C 29/06; F16C 33/72
[52] U.S. Cl. ......................................... 384/15; 384/45
[58] Field of Search ...................... 384/15, 43, 44, 45, 384/49

[56] References Cited

U.S. PATENT DOCUMENTS

| | | | |
|---|---|---|---|
| 5,080,498 | 1/1992 | Tsukada | 384/15 |
| 5,087,130 | 2/1992 | Tsukada | 384/15 |
| 5,209,575 | 5/1993 | Ohtake | 384/15 |
| 5,265,963 | 11/1993 | Kawaguchi | 384/43 |

FOREIGN PATENT DOCUMENTS 1717 1/1986 Japan .
112021 4/1989 Japan .

Primary Examiner—Thomas R. Hannon
Attorney, Agent, or Firm—Browdy and Neimark

[57] ABSTRACT

The linear motion rolling guide unit makes efficient use of the spaces in the casing to easily attach the under seals to the end caps in such a way that deformation by thermal expansion and swelling can be dealt with, assuring a good sealing performance. The under seals are provided with a longitudinally extending core band, which has hook portions at its ends. The outer end surfaces of the end caps are formed with engagement holes, into which the hook portions are fitted. If there are differences in thermal expansion between the end caps and the under seals, or if deformations occur due to swelling, the hook portions of the core band elastically deform absorbing the dimensional changes to prevent the under seals from being distorted or buckled.

6 Claims, 4 Drawing Sheets

LINEAR MOTION ROLLING GUIDE UNIT

BACKGROUND OF THE INVENTION

1. Field of the Invention

The present invention relates to a linear motion rolling guide unit suitably applied for machine tools, industrial robots, precision processing equipment and testing equipment, in which sliders slide on track rails with a number of rolling elements interposed therebetween.

2. Description of the Prior Art

Linear motion rolling guide units generally have sliders mounted astride track rails with a large number of rolling elements interposed therebetween so that the sliders can slide on the track rails. The sliders can be slid forwardly and backwardly with high precision over relatively long distances.

One such conventional linear motion rolling guide unit is explained by referring to FIG. 8. The linear motion rolling guide unit, as shown in FIG. 8, includes mainly: a track rail 1 having raceway surfaces 9 formed in raceway grooves on longitudinally extending side wall surfaces 11; and a slider 20 slidably mounted astride the track rail 1. The slider 20 includes: a casing 2 which is slidable relative to the track rail 1 and has raceway surfaces 8 formed in raceway grooves at positions facing the raceway surfaces 9 and also has return passages 32; a number of balls 4 as rolling elements trapped between the facing raceway surfaces 8 and 9 to allow relative motion between the track rail and the casing; and end caps 5 attached to the longitudinal ends of the casing 2, the longitudinal direction being the direction in which the casing slides. The outer end of each end cap 5 is fitted with an end seal 19 that provides a seal between the track rail 1 and the slider 20. The balls 4 run circulating through the raceways 34 formed between the raceway surfaces 8 and 9, direction changing passages in the end caps 5 (see reference number 33 in FIG. 1), and through the return passages 32. For the purpose of sealing the gap between the casing 2 and the longitudinal side wall surfaces 11 of the track rail 1 and also the underside of the casing 2, an under seal 3 is provided to the casing 2.

The under seal 3, although it has the advantage of being simple in shape and readily manufacturable, poses some problems. That is, because the under seal 3 is thin, it is likely to be deformed by positioning errors between the casing 2 and the track rail 1 that form the raceways 8, 9 and by external forces. Thus, how the under seal 3 should be mounted to the casing 2 has long been an issue to be resolved.

One example process of mounting the under seal to the casing, as disclosed in Japanese Patent Laid-Open No. 112021/1989, is described by referring to FIG. 9 and FIG. 10. The linear motion rolling guide unit shown in FIG. 9 and FIG. 10 has basically the same construction and function as the unit shown in FIG. 8 and the parts identical with those of FIG. 8 are assigned like reference numerals.

The under seal 3 in the linear motion rolling guide unit, as shown in FIG. 9 and 10, comprises: a seal portion 7 that projects like a lip and is sealingly engageable with the side wall surface 11 of the track rail 1; a seal portion 10 that has its upper surface 21 as a sealing surface and is sealingly engageable with the undersurfaces of the casing 2 and the end caps 5; and a retaining portion 6 that keeps the rolling elements 4 in the raceways. These portions are formed into one integral structure of the same material. In this linear motion rolling guide unit, the seal portion 10 of the under seal 3 is arranged below the casing and in contact with the undersurface 12 of the casing 2, and a screw 16 is passed through a through-hole 15 formed in the under seal 3 and screwed into a threaded hole in the casing 2 to securely fix the under seal 3 to the casing 2.

With the linear motion rolling guide unit shown in FIG. 9 and 10, however, since the under seal 3 is secured at both ends to the metal casing 2 by screws 16 and hence cannot be moved relative to the casing 2, the under seal 3 formed of, for example, synthetic resin will be deformed after it is swelled by lubricating oil over a long period of use. Once the under seal 3 is deformed, the sealing contact condition between the undersurface 12 of the casing 2 and the upper surface 21 of the under seal 3 deteriorates. The seal portion 7 may also deform, degrading the contact condition between the seal portion 7 and the side wall surface 11 of the track rail 1, lowering the sealing performance of the linear motion rolling guide unit, particularly the dust-sealing effect. At the same time, the retaining portion 6 that retains the balls 4 may also deform increasing the gap between the top edge 14 of the retaining portion 6 and the ball retaining band 17, so that when the slider 20 is taken off the track rail 1, the balls 4 will no longer be able to be contained in the casing 2 because of their own weight and may fall from the casing 2.

Another method of mounting the under seal to the casing is proposed by Japanese Utility Model Laid-Open No. 1717/1986, which discloses a linear guide apparatus. This linear guide apparatus consists of: a long rail having a plurality of raceway grooves formed axially therein; a sliding member shaped like a saddle with a pair of arms and having raceway grooves facing the corresponding raceway grooves formed in the rail; a number of rolling elements that roll trapped between the raceway groove in the rail and the raceway groove in the sliding member; end caps mounted to both ends of the sliding member to form a circulating path for the rolling elements and to prevent dust from entering the rolling element portion from the ends of the sliding member; and dust-prevention members longer than the arms of the sliding member and arranged at the underside of the arms, the dust-prevention members being supported at both ends by the end caps, with one of their side edges placed in contact with the side surfaces of the rail to prevent dust from entering the rolling element portion from below. The arms of each end cap are formed with grooves on the side that comes into contact with the sliding member. The ends of the dust-prevention members are fitted into the grooves in the end caps so that the dust-prevention members are clamped and supported by the two end caps. The dust-prevention members in the linear guide correspond to the under seals in the linear motion rolling guide unit.

With the above linear guide apparatus, however, the dust-prevention members arranged at the underside of the arms are supported by the end caps. Since the dust-prevention members and the end caps are made of different materials, they generally have different thermal expansions caused by temperature changes. Therefore, if the thermal expansion of the dust-prevention member is larger than that of the end cap, a deflection occurs in the dust-prevention member, causing a gap between it and the rail or between it and the underside of the arms, which in turn deteriorates the sealing effect. As a result, dust can no longer be prevented from entering the interior of the linear guide equipment.

SUMMARY OF THE INVENTION

A primary objective of the present invention is to resolve the above-mentioned issues and to provide a linear motion rolling guide unit, which eliminates the need to tap male and female screws that are normally required to attach the under seals to the underside of the casing; which, in mounting the under seals, utilizes the spaces defined by the inclined portions of the casing that were formed to avoid interference with a whetstone during the process of grinding the raceway surfaces in the casing and thereby eliminates the reduction in the distance between the underside of the casing and the base, as would otherwise occur due to the presence of the under seals; and which facilitates the attaching of the under seals to the end caps and gives elasticity to the structure of the under seals to prevent formation of gaps that would otherwise be caused by deformation and buckling, thereby assuring a good sealing performance.

Another objective of this invention is to provide a linear motion rolling guide unit, which comprises:

a track rail having first raceway surfaces formed on longitudinally extending sidewall surfaces thereof;

a casing slidable relative to the track rail and having second raceway surfaces formed at positions facing the first raceway surfaces;

end caps attached to the longitudinal ends of the casing;

a number of rolling elements circulating through raceways between the first raceway surfaces and the second raceway surfaces;

end seals placed in contact with the outer end surfaces of the end caps; and under seals having seal portions that are sealingly engageable with the underside of the casing and with the side wall surfaces of the track rail;

wherein the under seals each comprise an longitudinally extending core band having hook portions formed at the ends thereof, a first seal portion secured to the core band and sealingly engageable with the side wall surfaces of the track rail, and a second seal portion secured to the core band and sealingly engageable with the underside of the casing, and the outer end surfaces of the end caps are formed with engagement holes in which to fit the hook portions of the core band.

In this linear motion rolling guide unit, tile under seals are installed in spaces defined by inclined surfaces of the casing that are formed to avoid interference with a whetstone during the process of grinding the raceways in the casing.

The under seals can easily be attached to the end caps by engaging the hook portions of the core band in the engagement holes formed in the end caps to hold the end caps from outside. This structure eliminates the need to drill threaded holes in the slider casing, as is required with the conventional units to mount the under seals to the slider, thus achieving substantial reductions in the manufacturing cost.

With the under seals attached to the end caps, the core band holds the end caps—which are mounted to the ends of the slider—from outside, and the under seals are provided with elasticity by the hook portions. Therefore if there are differences in thermal expansion between the end caps and the under seals, or if the under seals swell by soaking lubricants, the hook portions of the core band or elastic band elastically deform absorbing the dimensional changes to prevent formation of gaps between the under seals and the underside of the casing or between the under seals and the side wall surfaces of the track rail even when the sealing portions of the under seals are deformed or buckled.

When, for example, the thermal expansion of the end caps is larger than that of the under seals, the core band receives a tension but the U-shaped hook portions elastically expand, preventing the under seals from being distorted. When the thermal expansion of the end caps is smaller, the hook portions, since they are situated at the outer end surfaces of the end caps, will not receive reactive forces at all, leaving no possibility of the under seals being buckled.

Therefore, the sealing portions of the under seals can maintain sealing contact with the underside of the casing and with the side wall surfaces of the track rail. That is, it is possible to offer good sealing condition on the sliding surface between the track rail and the slider at all times, preventing foreign matters such as dust, dirt and water from entering and thereby improving the dust-sealing performance.

Further, since the under seals are formed separate from the casing, it is possible to cut the second raceway surfaces in the casing with ease and with high precision, substantially improving the bearing performance of the linear motion rolling guide unit.

At the underside of the casing, spaces are defined by the inclined portions that are formed to avoid interference with a whetstone during the process of cutting the raceway grooves. By installing the under seals in these spaces, the gap between the casing and the base can be increased. Because the arrangement of the under seals in the spaces increases the gap below the casing, it is possible to lower the casing itself, which in turn reduces the overall height of the linear motion rolling guide unit.

DETAILED DESCRIPTION OF EMBODIMENTS

Figure 6:
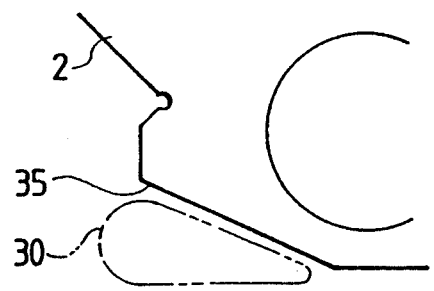
FIG. 6 is an enlarged view of a part of the casing indicated by symbol A.
Figure 7:
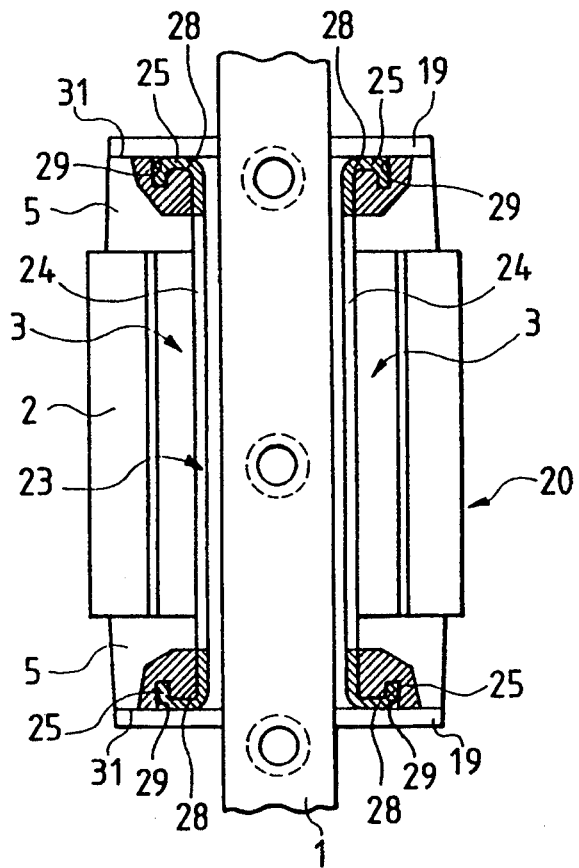
FIG. 7 is a bottom view of the linear motion rolling guide unit of FIG. 1 as seen from below.
Figure 8:
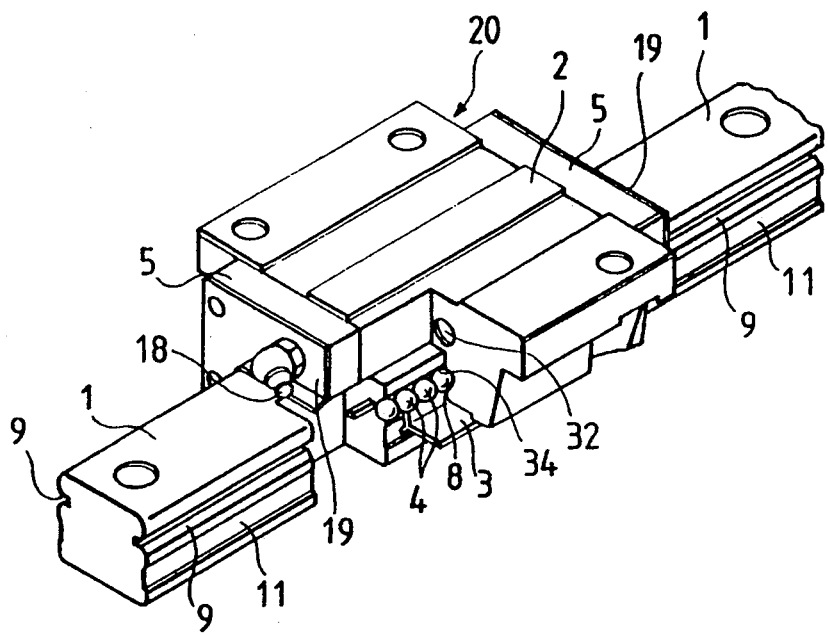
FIG. 8 is a partly cutaway perspective view showing one example of the conventional linear motion rolling guide unit.
Figure 9:
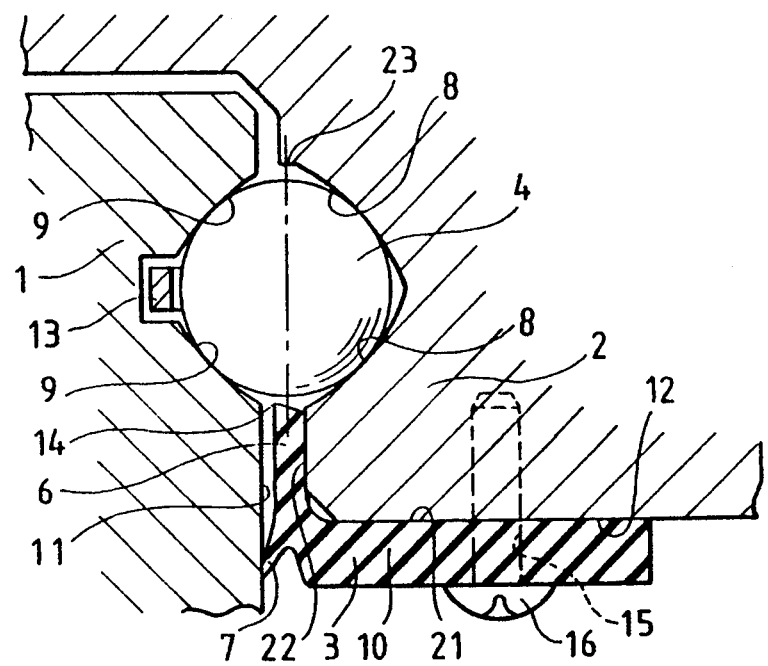
FIG. 9 is a cross section showing one example of the linear motion rolling guide unit.
Figure 10:
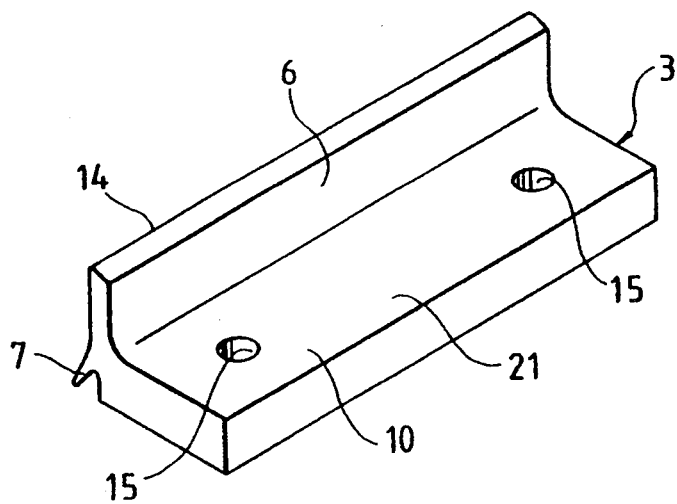
FIG. 10 is a perspective view showing one example of the under seal shown in FIG. 9.

Now, by referring to the accompanying drawings, one embodiment of the linear motion rolling guide unit according to this invention will be described. The linear motion rolling guide unit shown in FIG. 1 through FIG. 7 are a four-raceway endless linear motion rolling guide unit. In FIG. 1 to FIG. 7, parts that are identical with those of FIG. 8 to FIG. 10 are given like reference numerals.

Figure 1:
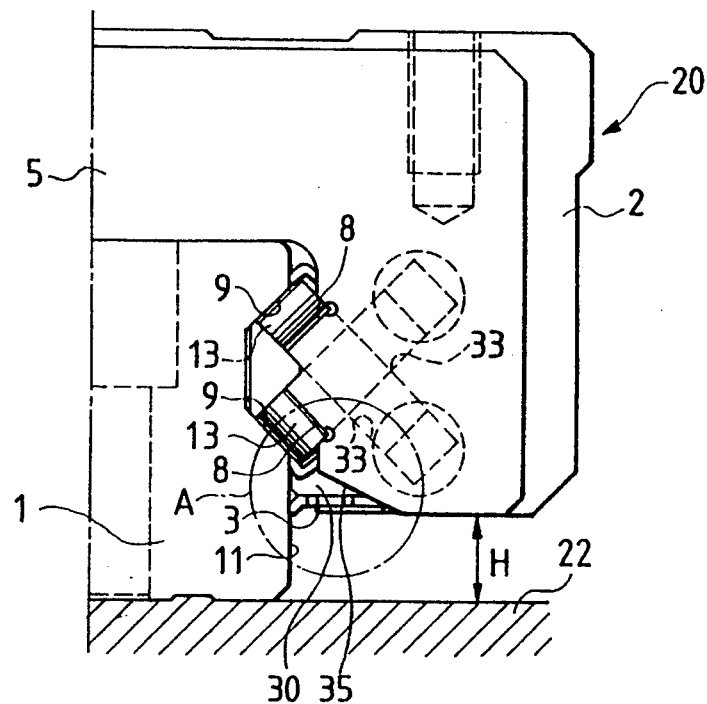
FIG. 1 is a cross section of the right having of the linear motion rolling guide unit according to the present invention.

As shown in FIG. 1, the track rail 1 is secured to the base 22 and the slider 20 is slidably mounted astride the track rail 1. The track rail 1 has raceway surfaces 9 formed in two raceway grooves on each longitudinally extending sidewall surface 11 thereof. The slider 20 straddles the track rail 1 so that it can slide relative to the track rail. The slider 20 includes: a casing 2 having raceways 8 formed in raceway grooves at positions facing the raceway surfaces 9 on the track rail 1; a number of cylindrical rolls 13 as rolling members trapped between the facing raceway surfaces 8 and 9 to allow relative motion of the slider and the track rail; under seals 3 to provide a seal between the track rail 1 and the casing 2; and end caps 5 attached to the longitudinal ends of the casing 2, the longitudinal direction being the direction in which the slider slides.

Figure 2:
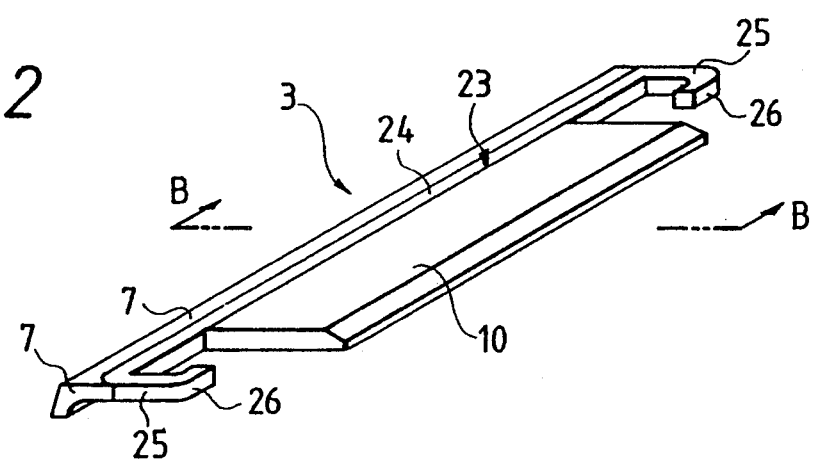
FIG. 2 is a perspective view of the under seal shown in FIG. 1.
Figure 3:
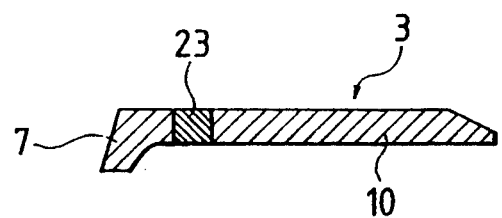
FIG. 3 is a cross section taken along the line B—B of FIG. 2.
Figure 4:
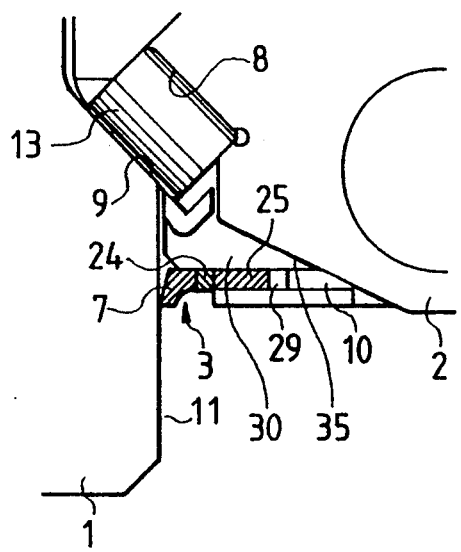
FIG. 4 is an enlarged view of a part in FIG. 1 indicated by symbol A.

The under seal 3, as shown in FIG. 2 and FIG. 3, consists of a longitudinally extending core band 23 made of stainless steel; and a seal portion 7 and a seal portion 10 made of elastic material like rubber and secured to each side of the core band 23 so that they clamp the core band 23 from both sides. These components of the core band are formed as an integral structure. The seal portion 7 comes into contact with the side wall surface 11 of the track rail 1 and the seal portion 10 engages the undersurface of the casing 2. The core band 23 comprises a linear core portion 24 to which the lip-shaped seal portion 7 and the seal portion 10 are connected; and U-shaped hook portions 25 formed at the ends of the core portion 24. End portions 26 of the hook portions 25 are formed substantially parallel to the core portion 24. The hook portion 25 may be rectangular in cross section.

Figure 5:
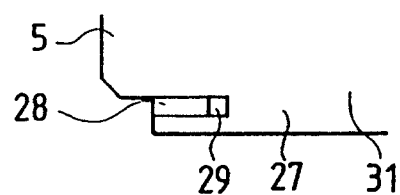
FIG. 5 is an enlarged view of a part of the end cap indicated by symbol A.

The end caps 5 are generally formed of synthetic resin. As shown in FIG. 7, the end cap 5 is provided on its outer end surface 31 with an end seal 19 that provides a seal between the track rail 1 and the slider 20 and with a grease nipple 18 (see FIG. 8) for supplying lubricants to the sliding surface between the track rail 1 and the slider 20. The end cap 5 is formed with raceway grooves that cooperate with the track rail 1 to form raceways for the cylindrical rolls 13 and with direction changing passages 33 for changing the direction of motion of the cylindrical rolls 13 for circulation. As shown in FIG. 5, on the outer end surface 31, i.e. the end surface on the side where the end seal 19 is mounted, the end cap 5 is formed with a groove 28 extending horizontally at the lower portion of each arm 27 thereof. At the inner end of tile groove 28 is formed an engagement hole 29 in which the end portion 26 of the hook portion 25 is fitted. The engagement hole 29 is preferably formed into a complementary shape that allows snug fitting therein of the end portion 26 of the hook portion 25. As shown in FIG. 6, the casing 2 is formed with an inclined surface 85 to avoid interference with the whetstone during grinding and to provide a whetstone space 30 below the casing 2.

Mounting of the under seal 3 to the end cap 5 is accomplished by first installing the under seal 3 in the whetstone space 30 below the casing 2 and engaging the end portions 26 of the hook portions 25 formed at the ends of the core band 23 with the engagement holes 29 in the end caps 5. Since the cross-sectional shape of the end portion 26 of the hook portion 25 is the same as that of the engagement hole 29, engaging the end portion 26 in the engagement hole 29 renders the under seal 3 unrotatable with respect to the end cap 5. In this assembled condition, the end portion 26 of the hook portion 25 is aligned in the same direction as the core portion 24. Because the under seal 3 is arranged in the whetstone space 30, the gap (height H) between the underside of the casing 2 and the base 22 can be made large. That is, when compared with the conventional unit where the under seal 3 is placed in contact with the undersurface 12 of the casing 2 as shown in FIG. 9, the unit of this invention has a greater distance (or height indicated by H) between the underside of the casing 2 and the base 22. This means that the casing 2 can be set at a lower position, making it possible to reduce the overall height of the linear motion rolling guide unit.

If there is a difference in thermal expansion between the end cap 5 and the under seal 3 when the unit is heated as the slider 20 slides on the track rail 1, the U-shaped hook portions 25 formed on the core band 23 elastically deform absorbing dimensional changes to prevent deformation or buckling of the under seal 3. In more detail, when the thermal expansion of the end cap 5 is greater than that of the core portion 24, the end portions 26 of the hook portions 25 are pulled by the end caps 5 and simply expand outwardly, preventing the core portion 24 and the seal portions 7, 10 from being deformed. Conversely, when the thermal expansion of the end cap 5 is smaller than that of the core portion 24, the end portions 26 of the hook portions 25 simply expand in a direction in which they come off the engagement holes 29. Since the thermal expansion does not produce any reactive force, the core portion 24 is prevented from being buckled. When the core portion 24 expands in a straight line without bending, the seal portions 7 and 10 are not strained and hence the sealing performance is not affected at all. In this way, it is possible to prevent the under seal 3 from being deformed or buckled as the unit is thermally expanded by temperature changes.

As described above, in the linear motion rolling guide unit of this invention, the slider 20 is mounted astride the track rail 1 with the circulating cylindrical rollers 13 interposed therebetween to permit the slider 20 to freely slide along the track rail 1. The cylindrical rollers 13 that run loaded along the raceway surfaces 9 on the track rail 1 are led into the direction changing passages formed in the end caps 5 and from there into the return passages formed in the casing 2. In this way, a large number of cylindrical rollers 13 circulate through the endless circulation path. Because of the rotating motion of the loaded cylindrical rollers 13 trapped between the raceway surfaces 8 formed in the casing 2 and the raceway surfaces 9 formed in the track rail 1, the slider 20 and the track rail 1 can slide relative to each other. Radial loads and moment loads acting through the slider 20 in the vertical and lateral directions are born by the track rail 1.

I claim:
1. A linear motion rolling guide unit comprising:
   a track rail having first raceway surfaces formed on longitudinally extending sidewall surfaces thereof;
   a casing slidable relative to the track rail and having second raceway surfaces formed at positions facing the first raceway surfaces, the casing also having return passages formed therein, the underside of the casing on the track rail side being formed as inclined surfaces to provide spaces;

end caps attached to the longitudinal ends of the casing and having direction changing passages formed therein;

raceways formed between the first raceway surfaces and the second raceway surfaces;

rolling elements circulating through the raceways, the direction changing passages and the return passages;

under seals making sealing contact with the side wall surfaces of the track rail and mounted to the end caps;

wherein the under seals each comprise a longitudinally extending core band and an elastic seal portion secured to the core band;

wherein the core band comprises a longitudinally extending core portion and hook portions formed at the ends of the core portion and extending widthwise;

wherein the seal portion comprises a first seal portion sealingly engageable with the side wall surfaces of the track rail and a second seal portion sealingly engageable with the underside of the casing; and wherein the outer end surface of each of the end caps is formed with engagement holes in which the hook portions of the core band are engaged, and the under seals are mounted to the end caps by fitting the hook portions in the engagement holes.

2. A linear motion rolling guide unit according to claim 1, wherein the under seals are arranged in the spaces that are defined by the inclined surfaces formed at the underside of the casing.

3. A linear motion rolling guide unit according to claim 1, wherein the hook portions of the core band are bent in a direction away from the track rail and the end portions of the hook portions are bent toward the end caps.

4. A linear motion rolling guide unit according to claim 1, wherein the end surface of each of the end caps is formed with grooves extending in a direction away from the track rail, and at the end of each of the grooves are formed the engagement holes, the hook portions being fitted in the grooves.

5. A linear motion rolling guide unit according to claim 1, wherein the engagement holes in the end caps elastically hook the end portions of the hook portions to fit the under seals to the end caps.

6. A linear motion rolling guide unit according to claim 1, wherein the first seal portion sealingly engageable with the side wall surfaces of the track rail is secured to one side surface of the core portion of the core band and the second seal portion sealingly engageable with the underside of the casing is secured to the other side surface of the core portion.

* * * * *